(12) United States Patent
Gilton et al.

(10) Patent No.: US 11,561,873 B2
(45) Date of Patent: Jan. 24, 2023

(54) TEST EQUIPMENT INTERFACE ADD-ON HAVING A PRODUCTION SUPPORT EQUIPMENT MODULE AND A SELECTIVELY REMOVABLE TEST SUPPORT EQUIPMENT MODULE

(71) Applicant: General Electric Company, Schenectady, NY (US)

(72) Inventors: Jeffrey S. Gilton, Cincinnati, OH (US); Brian T. Clark, Cincinnati, OH (US); Matthew B. Pfenninger, Cincinnati, OH (US); Vasanth Ganapathy, Mason, OH (US); Douglas R. Nichols, Kentwood, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/030,824

(22) Filed: Sep. 24, 2020

(65) Prior Publication Data
US 2021/0096970 A1 Apr. 1, 2021

Related U.S. Application Data

(60) Provisional application No. 62/906,309, filed on Sep. 26, 2019.

(51) Int. Cl.
| | | |
|---|---|---|
| *G06F 11/22* | (2006.01) | |
| *G06F 11/30* | (2006.01) | |
| *G06F 11/273* | (2006.01) | |

(52) U.S. Cl.
CPC ...... *G06F 11/2221* (2013.01); *G06F 11/2273* (2013.01); *G06F 11/2733* (2013.01); *G06F 11/3089* (2013.01)

(58) Field of Classification Search
CPC ............. G06F 11/2221; G06F 11/2273; G06F 11/2733; G06F 11/3089
See application file for complete search history.

(56) References Cited

U.S. PATENT DOCUMENTS

| | | | | |
|---|---|---|---|---|
| 4,393,498 A | * | 7/1983 | Jackson | G06F 11/277 |
| | | | | 714/46 |
| 4,974,149 A | * | 11/1990 | Valenti | G06Q 10/10 |
| | | | | 709/217 |

(Continued)

FOREIGN PATENT DOCUMENTS

| | | |
|---|---|---|
| CN | 101236129 B | 3/2013 |
| CN | 109739212 A | 5/2019 |

(Continued)

OTHER PUBLICATIONS

Wikipedia's FADEC historical version published Sep. 19, 2019 https://en.wikipedia.org/w/index.php?title=FADEC&oldid=916564884 (Year: 2019).*

(Continued)

*Primary Examiner* — Joseph O Schell
(74) *Attorney, Agent, or Firm* — Dinsmore & Shohl LLP

(57) ABSTRACT

Devices, systems, and methods for providing an engine control system configured with a two-part test equipment monitor where at least one part is selectively removable are disclosed. An engine control system for an aircraft includes an electronic control unit (ECU). The ECU is configured to implement a production support equipment module and a selectively removable test support equipment module. The production support equipment module enables restricted data monitoring of the engine control system. The test support equipment module enables a comprehensive interface with the engine control system when installed with the ECU.

17 Claims, 4 Drawing Sheets

(56) References Cited

U.S. PATENT DOCUMENTS

| | | | | |
|---|---|---|---|---|
| 5,815,071 | A * | 9/1998 | Doyle | G08G 1/202 340/439 |
| 7,305,658 | B1 * | 12/2007 | Hamilton | G06F 8/65 707/999.009 |
| 7,840,320 | B2 | 11/2010 | Ausloos et al. | |
| 8,352,903 | B1 * | 1/2013 | Friedman | G06F 8/30 717/100 |
| 9,315,274 | B2 | 4/2016 | Presse | |
| 10,229,036 | B2 | 3/2019 | Braband | |
| 10,444,748 | B2 | 10/2019 | Feenstra et al. | |
| 10,496,379 | B2 * | 12/2019 | Pragya | G06F 11/3684 |
| 10,703,497 | B2 | 7/2020 | Bingham et al. | |
| 10,754,333 | B2 | 8/2020 | Descoqs et al. | |
| 2002/0169997 | A1 * | 11/2002 | Chen | G06F 11/2284 714/25 |
| 2005/0097515 | A1 * | 5/2005 | Ribling | G06F 11/3672 717/124 |
| 2005/0216895 | A1 * | 9/2005 | Tran | G06F 11/362 717/127 |
| 2008/0284618 | A1 * | 11/2008 | Fabas | G05B 23/0272 340/945 |
| 2008/0295090 | A1 * | 11/2008 | Bestle | G06F 8/65 717/170 |
| 2010/0083056 | A1 * | 4/2010 | Spier | G06F 11/0727 714/47.3 |
| 2012/0005531 | A1 * | 1/2012 | Manuzak | G06F 11/366 714/25 |
| 2014/0201716 | A1 * | 7/2014 | Alger | G06F 11/3696 717/124 |
| 2019/0034315 | A1 * | 1/2019 | Acosta | G06F 11/3409 |

FOREIGN PATENT DOCUMENTS

| | | |
|---|---|---|
| EP | 3694115 A1 | 8/2020 |
| JP | 2010537872 A | 12/2010 |
| KR | 101668603 B1 | 10/2016 |

OTHER PUBLICATIONS

Wikipedia's Electronic Control Unit historical version published Jul. 21, 2019 https://en.wikipedia.org/w/index.php?title=Electronic_control_unit&oldid=907276042 (Year: 2019).*

* cited by examiner

TEST EQUIPMENT INTERFACE ADD-ON HAVING A PRODUCTION SUPPORT EQUIPMENT MODULE AND A SELECTIVELY REMOVABLE TEST SUPPORT EQUIPMENT MODULE

CROSS-REFERENCE TO RELATED APPLICATIONS

This application claims the benefit of U.S. Provisional Application No. 62/906,309 filed Sep. 26, 2019, the contents of which are incorporated herein by reference.

TECHNICAL FIELD

The present disclosure relates to devices, systems, and methods for providing an engine control system, and more particularly, to an engine control system configured with a two-part test equipment monitor where at least one part is selectively removable.

BACKGROUND

Engine control systems include test equipment monitor (TEM) hardware and software that is used to monitor data, make adjustments, and inject data into a digital component in the engine control system. For example, a TEM enabled engine control system provides functionality such as streaming data from the memory of the engine control system to test equipment and/or an aircraft bus, provide a means for modifying the accessed memory, making adjustments, reading and/or writing to memory modules, injecting parameter data such as pressures when it is difficult to manipulate them in a test rig, and interface with other installed software within the engine control system and/or connected systems.

During development, production, and flight tests, TEM software, in particular, functionality beyond simple monitoring of data within the engine control system is essential for testing and validating the operation of an aircraft. That is, functionality including the ability to modify lists of addresses in memory, make adjustments, read and/or write to memory modules, and/or inject parameter data such as sensor values into digital components of the engine control system to provide simulation scenarios not readily available through a test rig which are utilized to carry-out development, production, and flight testing of an aircraft. Once the aircraft is ready for a post-production environment, for example, commercial or field use, access restrictions to portions of the TEM software within the engine control system are deactivated. In some instances, the deactivated portions of the TEM software are only subsequently accessible upon validation of an interlock such as a connection to test equipment through a communication interface (e.g., a COMM discrete) and/or reconfiguration of the engine control system into a TEM allowed mode.

However, since TEM software that enables the manipulation and reconfiguration of an aircraft engine control system are still installed within the production unit of a post-production aircraft, nefarious actors may determine means for accessing the TEM software and hardware functionality of the engine control system.

Accordingly, a need exists for increasing the security of an engine control system while maintaining the ability to provide TEM hardware and software functionality during production and post-production field use.

SUMMARY

In an embodiment, an engine control system for an aircraft includes an electronic control unit (ECU), where the ECU is configured to implement a production support equipment module, where the production support equipment module enables restricted data monitoring of the engine control system; and a selectively removable test support equipment module, where the test support equipment module enables a comprehensive interface with the engine control system when installed with the ECU.

In an embodiment, a system includes an engine control system for an aircraft includes an ECU, where the ECU is configured to implement a production support equipment module, where the production support equipment module enables restricted data monitoring of the engine control system; and a selectively removable test support equipment module, where the test support equipment module enables a comprehensive interface with the engine control system when installed with the ECU.

In an embodiment, a method of providing an engine control system includes providing an ECU, installing a production support equipment module, where the production support equipment module enables restricted data monitoring of the engine control system; installing a test support equipment module, where the test support equipment module enables a comprehensive interface with the engine control system when installed with the ECU; performing one or more operations with the test support equipment module; and uninstalling the test support equipment module when the test support equipment module is no longer needed for developing, testing, or configuring the engine control system.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Referring to the figures, embodiments of the present disclosure are generally related to devices, systems, and methods for providing an engine control system configured with a two-part test equipment monitor where at least one part is selectively removable from the engine control system. As described below in further detail, in order to improve security of aircraft operating in the field (i.e., after development, production, and flight testing activities are complete), methods and systems have been developed to separate and selectively install and uninstall test support equipment hardware and/or software from an engine control system. By providing an engine control system where the test support equipment is selectively installed and subsequently uninstalled when the test support equipment is no longer needed the security of an engine control system is improved.

In some current engine control systems, functionality that enables comprehensive data monitoring and changing adjustable parameters, for example, are simply deactivated or locked down through a level of security requiring an authenticated password or the like. That is, nefarious and/or malicious actors may learn how to gain access to such functionality to disrupt the operation of an engine control system. However, through the systems and methods described herein, nefarious and/or malicious actors will have no functionality to gain access to because the hardware and/or software that enables, for example and without limitation, comprehensive data monitoring and the ability to change adjustable parameters does not reside in the engine control system when it is not needed by an authorized party for activities such as development, production, testing, maintenance, or the like.

The following will briefly describe an example aircraft system having an engine control system followed by the systems and methods for providing an engine control system, configured with a two-part test equipment monitor where at least one part is selectively removable. The various systems and methods will now be described in more detail herein with specific reference to the corresponding drawings.

Figure 1:
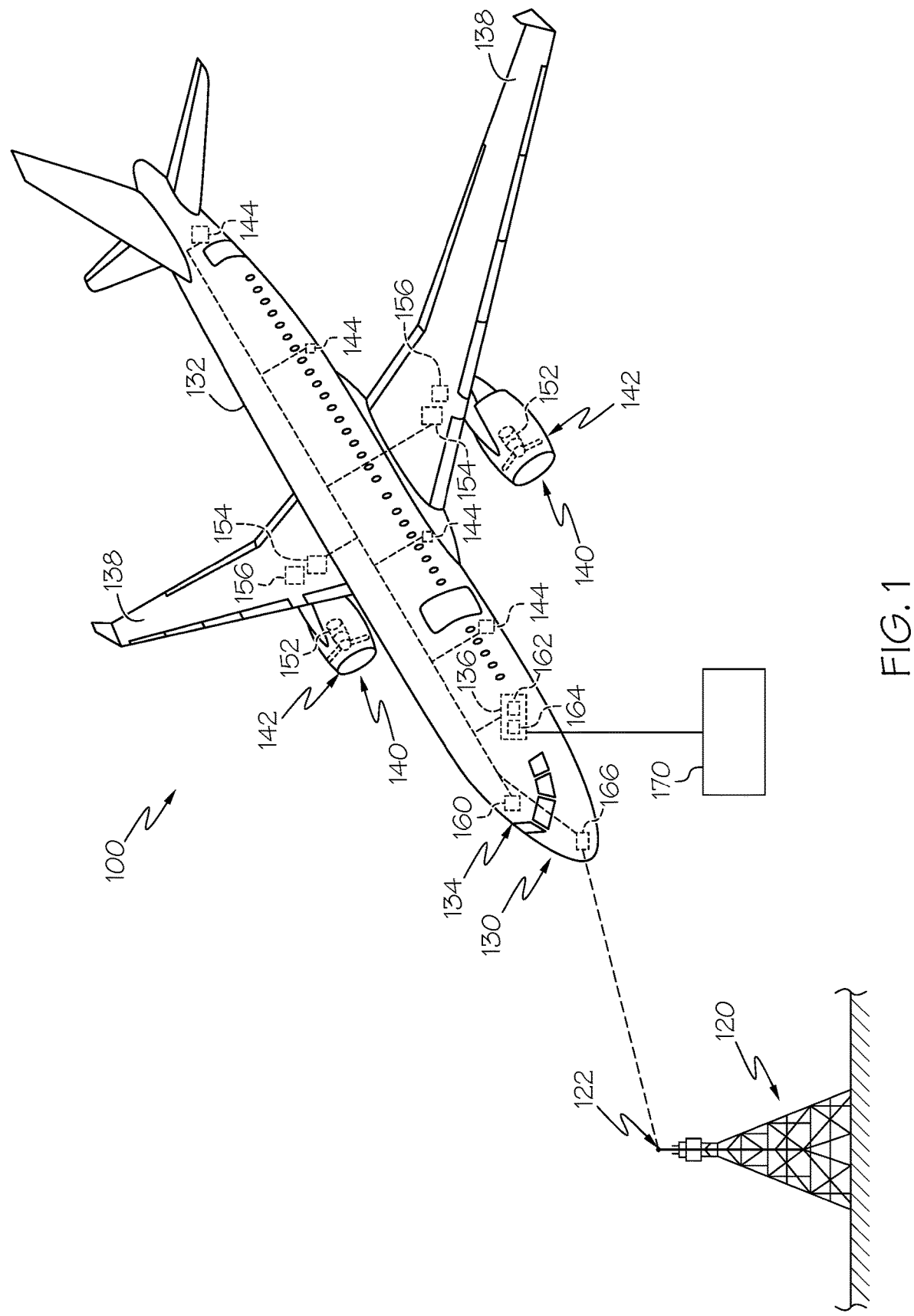
FIG. 1 schematically depicts an example aircraft system according to one or more embodiments shown and described herein.

Referring to FIG. 1, an illustrative aircraft system 100 is schematically depicted. In the illustrated embodiment of FIG. 1, the aircraft system 100 generally includes an aircraft 130, which may include a fuselage 132, wing assemblies 138, and one or more engines 140. While FIG. 1 depicts the aircraft 130 as being a fixed-wing craft having two wing assemblies 138 with one engine 140 mounted on each wing assembly 138 (two engines 140 total), other configurations are contemplated. For example, other configurations and/or aerial vehicles may include high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure. Furthermore, other configurations may include more than two wing assemblies 138, more than two engines 140 (e.g., trijets, quadjets, etc.), engines 140 that are not mounted to a wing assembly 138 (e.g., mounted to the fuselage 132, mounted to the tail, mounted to the nose, etc.), non-fixed wings (e.g., rotary wing aircraft), and/or the like.

Turning back to the illustrated aircraft system depicted in FIG. 1, as shown, a control mechanism 160 for controlling the aircraft 130 is included in the cockpit 134 and may be operated by a pilot located therein. It should be understood that the term "control mechanism" as used herein is a general term used to encompass all aircraft control components, particularly those typically found in the cockpit 134.

A plurality of additional aircraft systems 144 that enable proper operation of the aircraft 130 may also be included in the aircraft 130 as well as an engine control system 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The engine control system 136 may be communicatively coupled to the plurality of aircraft systems 144 and the engines 140. In some embodiments, the engine control system 136 may be mounted on one or more of the engines 140 or mounted within the aircraft 130 and communicatively coupled to the engines 140. While the embodiment depicted in FIG. 1 specifically refers to the engine control system 136, it should be understood that other controllers may also be included within the aircraft 130 to control various other aircraft systems 144 that do not specifically relate to the engines 140.

The engine control system 136 generally includes one or more components for controlling each of the engines 140, such as, for example, a diagnostic computer, an engine-related digital electronic unit that is mounted on one or more of the engines 140 or the aircraft 130, and/or the like. The engine control system 136 may also be referred to as a digital engine control system. Illustrative other components within the engine control system that may function with the engine control system 136 and may require software to operate include, but are not limited to, an electronic control unit (ECU) (200, FIG. 2) and other controller devices. The software implemented in any one of these components may be software that is distributed as described herein.

The engine control system 136 may also be connected with other controllers of the aircraft 130. In embodiments, the engine control system 136 may include a processor 162 and/or a non-transitory memory component 164, including non-transitory memory. In some embodiments, the non-transitory memory component 164 may include random access memory (RAM), read-only memory (ROM), flash memory, or one or more different types of portable electronic memory, such as discs, DVDs, CD-ROMs, or the like, or any suitable combination of these types of memory. The processor 162 may carry out one or more programming instructions stored on the non-transitory memory component 164, thereby causing operation of the engine control system 136. That is, the processor 162 and the non-transitory memory component 164 within the engine control system 136 may be operable to carry out the various processes described herein with respect to the engine control system 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof, installing software, installing software updates, modifying a record in a distributed ledger to indicate that software has been installed, and/or updated, carrying out processes according to installed and/or updated software, and/or the like.

In some embodiments, the engine control system 136 may include a full authority digital engine control (FADEC) system. Such a FADEC system can include various electronic components, one or more sensors, and/or one or more actuators that control each of the engines 140. In particular embodiments, the FADEC system includes an ECU, as well as one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software, such as the software that is distributed by the aircraft system 100 described herein. As such, the FADEC can be programmatically controlled to determine engine limitations, receive engine health reports, receive engine maintenance reports and/or the like to undertake certain measures and/or actions in certain conditions.

The software run by the engine control system 136 (e.g., executed by the processor 162 and stored within the non-transitory memory component 164) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine control system 136 and installed for use by the engine control system 136. For example, the computer program product may be provided by the ground support equipment 170, as described in greater detail herein. The computer program product may generally be updatable via a software update that is received from one or more components of the aircraft system 100, such as, for example, the ground support equipment 170, as described in greater detail herein. The software is generally updated by the engine control system 136 by installing the update such that the update supplements and/or overwrites one or more portions of the existing program code for the computer program product. The software update may allow the computer program product to more accurately diagnose and/or predict faults, provide additional functionality not originally offered, and/or the like.

In embodiments, each of the engines 140 may include a fan 142 and one or more sensors for sensing various characteristics of the fan 142 during operation of the engines 140. Illustrative examples of the one or more sensors include, but are not limited to, a fan speed sensor 152, a temperature sensor 154, and a pressure sensor 156. The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like.

In some embodiments, each of the engines 140 may have a plurality of sensors associated therewith (including one or more fan speed sensors 152, one or more temperature sensors 154, and/or one or more pressure sensors 156). That is, more than one of the same type of sensor may be used to sense characteristics of an engine 140 (e.g., a sensor for each of the different areas of the same engine 140). In some embodiments, one or more of the sensors may be utilized to sense characteristics of more than one of the engines 140 (e.g., a single sensor may be used to sense characteristics of two engines 140). The engines 140 may further include additional components not specifically described herein, and may include one or more additional sensors incorporated with or configured to sense such additional components in some embodiments.

In embodiments, each of the sensors (including, but not limited to, the fan speed sensors 152, the temperature sensors 154, and the pressure sensors 156) may be communicatively coupled to one or more components of the aircraft 130 such that signals and/or data pertaining to one or more sensed characteristics are transmitted from the sensors for the purposes of determining, detecting, and/or predicting a fault, as well as completing one or more other actions in accordance with software that requires sensor information. As indicated by the dashed lines extending between the various sensors (e.g., the fan speed sensors 152, the temperature sensors 154, and the pressure sensors 156) and the aircraft systems 144 and the engine control system 136 in the embodiment depicted in FIG. 1, the various sensors may be communicatively coupled to the aircraft systems 144 and/or the engine control system 136 in some embodiments. As such, the various sensors may be communicatively coupled via wires or wirelessly to the aircraft systems 144 and/or the engine control system 136 to transmit signals and/or data to the aircraft systems 144 and/or the engine control system 136 via an aircraft bus.

An aircraft bus may enable an aircraft and/or one or more components of the aircraft to interface with one or more external system through wireless or wired means. An aircraft bus as used herein may be formed from any medium that is configured to transmit a signal. As non-limiting examples, the aircraft bus is formed of conductive wires, conductive traces, optical waveguides, or the like. The aircraft bus may also refer to the expanse in which electromagnetic radiation and their corresponding electromagnetic waves are propagated. Moreover, the aircraft bus may be formed from a combination of mediums configured to transmit signals. In one embodiment, the aircraft bus includes a combination of conductive traces, conductive wires, connectors, and buses that cooperate to permit the transmission of electrical data signals to and from the various components of the engine control system 136. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

For example, an interconnectivity of components coupled via a network, may include a wide area network, such as the internet, a local area network (LAN), a mobile communications network, a public service telephone network (PSTN) and/or other network and may be configured to electronically connect components. The illustrative components that may be connected via the network include, but are not limited to, a ground system 120 in communication with the aircraft 130 (e.g., via a ground wireless communications link 122 and an aircraft wireless communications link 166), and/or a ground support equipment 170 via a wired or wireless system.

It should be understood that the aircraft 130 merely represents one illustrative embodiment that may be configured to implement embodiments or portions of embodiments of the devices, systems, and methods described herein. During operation, by way of non-limiting example, the control mechanism 160 may be utilized to operate one or more of the aircraft systems 144. Various sensors, including, but not limited to, the fan speed sensors 152, the temperature sensors 154, and/or the pressure sensors 156 may output data relevant to various characteristics of the engine 140 and/or the other aircraft systems 144. The engine control system 136 may utilize inputs from the control mechanism 160, the fan speed sensors 152, the temperature sensors 154, the pressure sensors 156, the various aircraft systems 144, one or more database, and/or information from airline control, flight operations, or the like to diagnose, detect, and/or predict faults that airline maintenance crew may be unaware of. Among other things, the engine control system 136 may analyze the data output by the various sensors (e.g., the fan speed sensors 152, the temperature sensors 154, the pressure sensors 156, etc.), over a period of time to determine drifts, trends, steps, or spikes in the operation of the engines 140 and/or the various other aircraft systems 144. The engine control system 136 may also analyze the system data to determine historic pressures, historic temperatures, pressure differences between the plurality of engines 140 on the aircraft 130, temperature differences between the plurality of engines 140 on the aircraft 130, and/or the like, and to diagnose, detect, and/or predict faults in the engines 140 and/or the various other aircraft systems 144 based thereon. The aircraft wireless communications link 166 and the ground wireless communications link 122 may transmit data such that data and/or information pertaining to the fault may be transmitted off the aircraft 130.

While the embodiment of FIG. 1 specifically relates to components within an aircraft 130, the present disclosure is not limited to such. That is, the various components depicted with respect to the aircraft 130 may be incorporated within various other types of craft and may function in a similar manner to deliver and install new software and/or updated software to the engine control system 136 as described herein. For example, the various components described herein with respect to the aircraft 130 may be present in watercraft, spacecraft, industrial engines, and/or the like without departing from the scope of the present disclosure.

Furthermore, it should be appreciated that, although a particular aerial vehicle has been illustrated and described, other configurations and/or aerial vehicles, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

Still referring to FIG. 1, the ground system 120 is generally a transmission system located on the ground that is capable of transmitting and/or receiving signals to/from the aircraft 130. That is, the ground system 120 may include a ground wireless communications link 122 that is communicatively coupled to the aircraft wireless communications link 166 wirelessly to transmit and/or receive signals and/or data. In some embodiments, the ground system 120 may be an air traffic control (ATC) tower and/or one or more components or systems thereof. Accordingly, the ground wireless communications link 122 may be a VHF communication system, an ACARS unit, a CPDLC system, FANS, and/or the like. Using the ground system 120 and the ground wireless communications link 122, the various non-aircraft components depicted in the embodiment of FIG. 1 may be communicatively coupled to the aircraft 130, even in instances where the aircraft 130 is airborne and in flight, thereby allowing for on-demand transmission of software and/or software updates whenever such software and/or software updates may be needed. However, it should be understood that the embodiment depicted in FIG. 1 is merely illustrative. In other embodiments, the aircraft 130 may be communicatively coupled to the various other components of the aircraft system 100 when on the ground and physically coupled to one of the components of the aircraft system 100, such as, for example, the ground support equipment 170.

The ground support equipment (GSE) 170 is an external equipment used to support and test the engine control system 136 and/or other components of the aircraft 102. The ground support equipment 170 is configured to provide software updates to the engine control system 136 and download data obtained by the engine control system 136 during a flight. As another non-limiting example, the GSE 170 may include production support equipment for restricted data monitoring, test support equipment for comprehensive data monitoring and changing adjustable parameters, and integration test rigs for system and software testing. In embodiments, the GSE 170 may be connected to the engine control system 136 via wired local area network, or Ethernet. The GSE 170 may communicate with the engine control system 136 according to Ethernet protocols. The GSE 170 may be a portable maintenance access terminal. The GSE 170 may test a ballistic mode of the aircraft by directly communicating with the ECU 200 of the engine control system 136, which is described in more detail herein.

Figure 2:
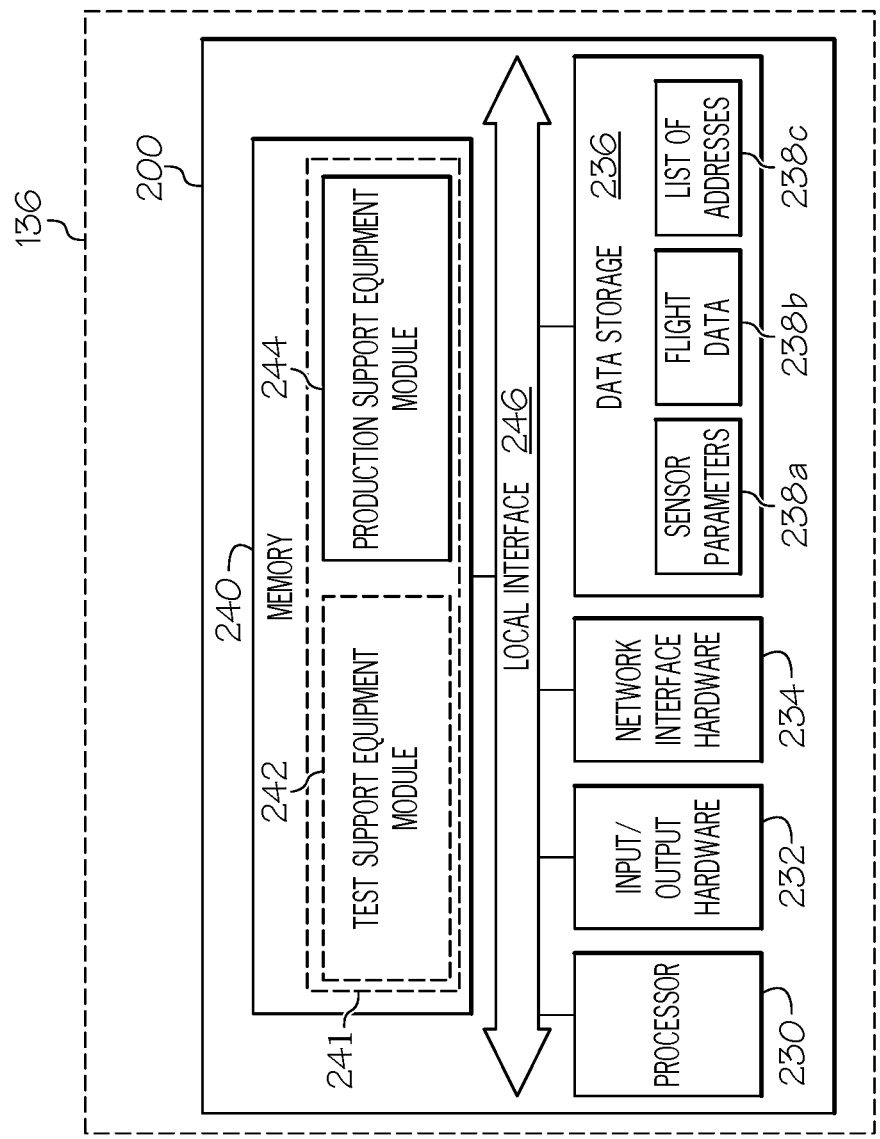
FIG. 2 schematically depicts a functional block diagram of an engine control system configured with a two-part test equipment monitor according to one or more embodiments shown and described herein.
Figure 3:
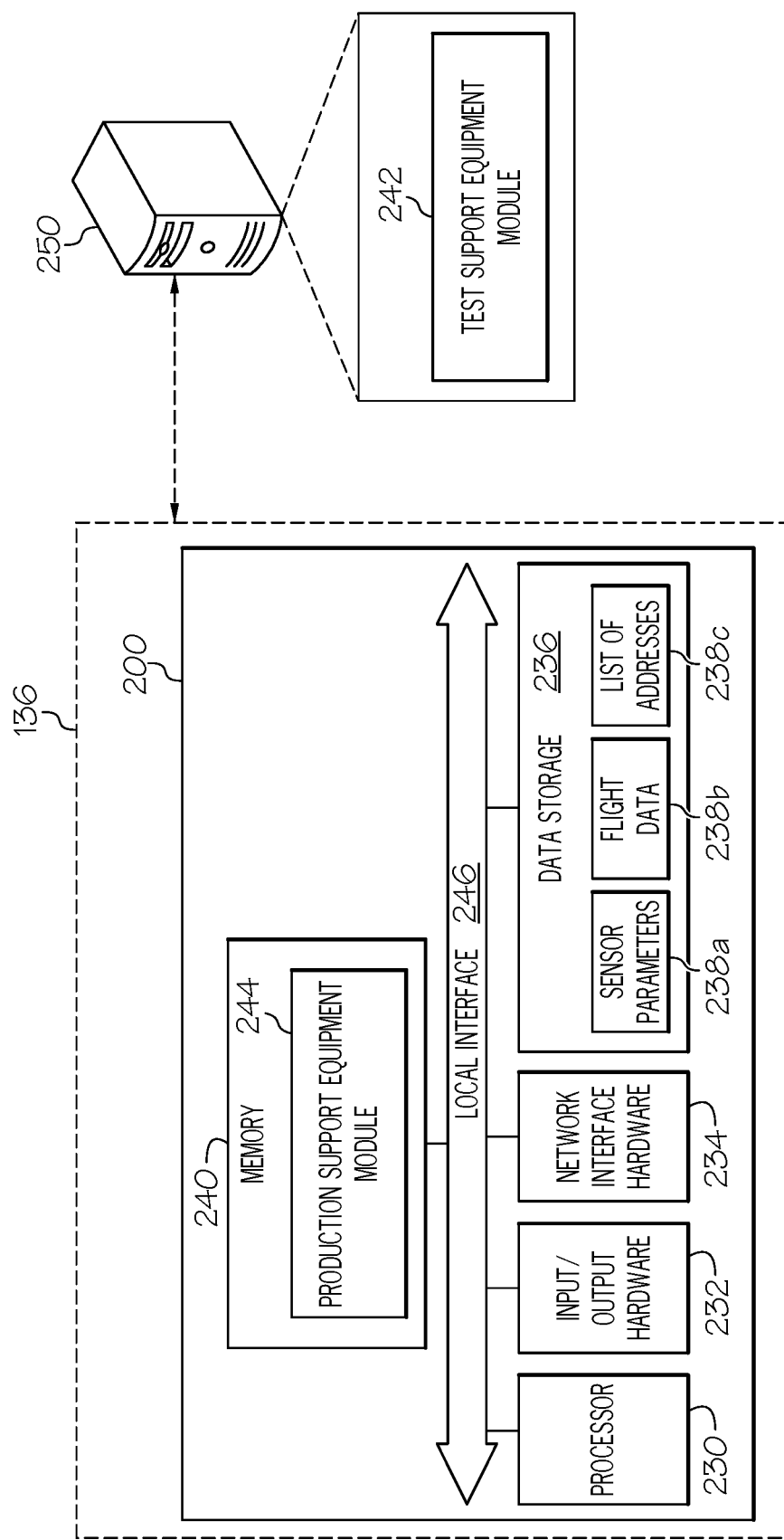
FIG. 3 schematically depicts another functional block diagram of an engine control system configured with a two-part test equipment monitor according to one or more embodiments shown and described herein.
Figure 4:
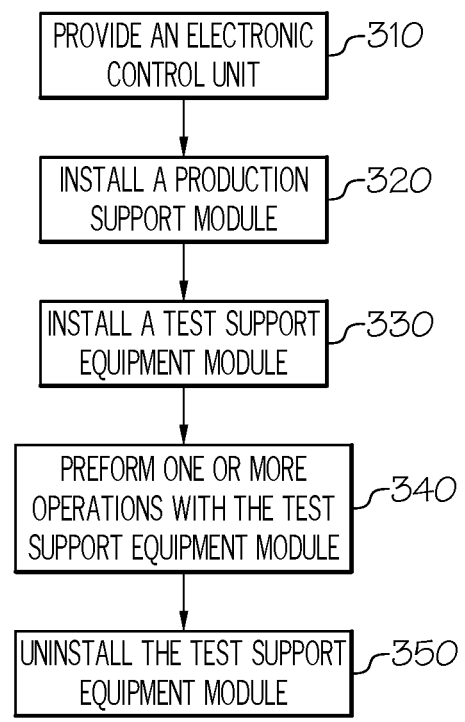
FIG. 4 depicts a flow diagram of an illustrative method of providing an engine control system configured with a two-part test equipment monitor according to one or more embodiments shown and described herein.

FIGS. 2-4 will now describe illustrative embodiments of providing an engine control system 136 configured with a two-part test equipment monitor module 241 where at least one part is selectively removable. Turning to FIG. 2, an illustrative system diagram of a portion of an engine control system 136 is depicted. In some embodiments, the engine control system 136 includes an ECU 200. The ECU 200 may include a computing device having the ability to operate and interface with components of the engine control system 136, for example, the components described herein with respect to FIG. 1. The ECU 200 may include a processor 230, input/output hardware 232, network interface hardware 234, a data storage component 236, and a memory component 240.

The processor 230 may include any processing component(s) configured to receive and execute instructions (such as from the data storage component 236 and/or the memory component 240). The instructions may be in the form of a machine-readable instruction set stored in the data storage component 236 and/or the memory component 240. The input/output hardware 232 may include a display, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks and/or devices. For example, the network interface hardware 234 may include a transceiver.

The memory component 240 may be machine-readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store a test support equipment module 242, a production support equipment module 244, and/or other modules that may be necessary for enabling operation of the engine control system 136 (each of which may be embodied as a computer program, firmware, or hardware, as an example).

A local interface 246 is also included in FIG. 2 and may be implemented as a bus or other interface to facilitate communication among the components of the ECU 200.

The data storage component 236 may reside local to and/or remote from the ECU 200 and may be configured to store one or more pieces of data for access by the ECU 200 and/or other components. As illustrated in FIG. 2, the data storage component 236 may store sensor parameters 238a, flight data 238b, lists of addresses 238c, and/or other data sets. The sensor parameters 238a may include sensor values obtained from one or more sensors communicatively coupled to the engine control system 136. In some embodiments, the test support equipment module 242 may be utilized to inject parameter data into the sensor parameters 238a so that a simulation of an engine control system 136 may be performed without directly affecting the operating condition. For example, the test support equipment module 242 may enable parameters such as pressure sensor values to be injected into the sensor parameters 238a of the ECU 200 so that the engine control system 136 may be tested without having to generate the pressures in a test rig. The flight data 238b may include data recorded during a flight, which may be monitored, downloaded, or otherwise utilized to evaluate the operation of an engine control system 136 and/or the aircraft. Additionally, the data storage component 236 may include one or more lists of addresses, which define positions in memory where information is stored or is allocated for storage.

The memory component 240 may include a test support equipment module 242 and a production support equipment module 244. Conventionally, an engine control system 136 includes a single test equipment monitor module 241 that enables the functionality of both the test support equipment module 242 and the production support equipment module 244. Moreover, lockups are generally put in place to prevent certain functionality of the test equipment monitor module 241 from being accessed when it is not needed or authorized. However, the restricted functionality of the test equipment monitor module 241 may still be accessible through unauthorized, nefarious, or malicious attacks on the engine control system 136.

Embodiments described herein remove the opportunity for an unauthorized, nefarious, or malicious actors from gaining access to restricted functionality of the engine control system 136. That is, embodiments herein enable the selective installation and uninstallation of the otherwise restricted functionality. This functionality is defined by the test support equipment module 242. The test support equipment module 242 may enable comprehensive data monitoring, the ability to change adjustable parameters, and integration of test rigs for system and software testing. More specifically, for example, the test support equipment module 242 may enable the sending of a continuous data stream to test equipment from a list of addresses in memory, the ability to modify the lists of addresses in memory, the ability to make adjustments to the engine control system 136, read and/or write to and from addresses in memory, and/or the ability to inject parameter data, for example, as sensor data values to carry out a simulation exercise. On the other hand, the production support equipment module 244 enables restricted data monitoring and/or queries regarding installed software versions, for example.

The test support equipment module 242 is configured so that it may be selectively installed and uninstalled when needed and not needed. For example, the test support equipment module 242 may be a software add-on, which may be installed in the ECU 200 by an authenticated and authorized individual. The test support equipment module 242 may subsequently be uninstalled once it is no longer needed. By uninstalling the test support equipment module 242, there is no functionality that an unauthorized, nefarious, or malicious actor may access. FIG. 2 depicts the test support equipment module 242 as a software add-on. However, the test support equipment module 242 may also be embodied in a hardware component that is selectively installed and uninstalled with the engine control system 136.

For example, FIG. 3 depicts another embodiment of providing an engine control system 136 configured with a two-part test equipment monitor where at least one part is selectively removable. In FIG. 3 the ECU 200 is configured the same as described with respect to FIG. 2. However, in FIG. 3, the test support equipment module 242 is configured within a hardware device 250. The hardware device 250 may be any computing device or test equipment hardware that is capable of being communicatively coupled to the engine control system 136, for example through a wired or wireless connection. In such an embodiment, the hardware device 250 includes a test support equipment module 242 embodied as firmware and/or software. The hardware device 250, when coupled with the engine control system 136 may cause the test support equipment module 242 to be installed within the memory component 240 of the ECU 200. Alternatively, the hardware device 250 may be communicatively installed with the engine control system 136 through a bus or other means, thereby enabling the functionality provided by the test support equipment module 242 while the test support equipment module 242 operates through the connected hardware device 250.

It should be understood that "installing" the test support equipment module 242 with the engine control system 136 may be accomplished by either locally installing the test support equipment module 242 in a memory component 240 of the ECU 200 (FIG. 2) or remotely installing and operating the test support equipment module 242 through a connected hardware device 250 (FIG. 3). Furthermore, it should be understood that "uninstalling" the test support equipment module 242 from the engine control system 136 may be accomplished by deleting the test support equipment module 242 from the memory component 240 of the ECU 200 (FIG. 2) or physically removing the hardware device 250 that is communicatively connected to the engine control system 136 (FIG. 3).

Turning to FIG. 4, an illustrative flow diagram depicting a method of providing an engine control system configured with a two-part test equipment monitor where at least one part is selectively removable is shown. The method includes providing an ECU at block 310. At block 320, the production support module may be installed with the ECU of the engine control system. At block 330, the test support equipment module may be installed with the ECU of the engine control system by at least one of the methods described above. For example, the test support equipment module may include software that is locally installed in the memory of the ECU. By way of another example, the test support equipment module may be installed and operated via a hardware device that is communicatively coupled to the engine control system. At block 340, one or more operations enabled by the test support equipment module may be performed. For example, the test support equipment module may initiate and enable the sending of a continuous data stream to test equipment such as a connected computing device or the like. The test support equipment module may initiate and enable the modifications to memory of the engine control system, adjustments to the engine control system, read and/or writing to memory addresses and/or injecting parameter data into the engine control system to carry out simulations of the system or aircraft.

At block 350, the test support equipment module is uninstalled. The test support equipment module may be uninstalled automatically when an authenticated user disconnects from the engine control system. For example, during development, production, testing, or maintenance an authenticated user may access the engine control system and install the test support equipment module, for example, as described with respect to block 330. In some instances, once the authenticated user disconnects from the engine control system, for example, by signing out or timing out via a login process with the engine control system, the test support equipment module may be automatically uninstalled. This may occur in response to a logoff subroutine loaded within the engine control system to reduce the chance of forgetting to uninstall the test support equipment module. In other embodiments, the test support equipment module may be uninstalled manually through a program removal and/or deletion process. In some embodiments, uninstalling the test support equipment module may be uninstalled when or by disconnecting a hardware device through which the test support equipment module is installed and operated. It should be understood that the processing of installing and uninstalling the test support equipment module may be accomplished in a variety of ways. For example, the test support equipment module may be installed and removed in a similar fashion as would an application on a PC or smart phone. In some cases, software deployed on the engine control system may include two versions on with test support equipment module and another without. The versions may be selectively installed when the test support equipment module is needed. Furthermore, when a subsequent version is installed the other version is automatically uninstalled, thereby reducing the need to perform a specific uninstall operation to remove the test support equipment module when it is not needed.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that the systems and methods described herein provide an engine control system configured with a two-part test equipment monitor where at least one part is selectively removable. For example, an engine control system for an aircraft ma include an ECU, where the ECU is configured to implement a production support equipment module and a selectively removable test support equipment module. The production support equipment module enables restricted data monitoring of the engine control system. The test support equipment module enables a comprehensive interface with the engine control system when installed with the ECU.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

Further aspects of the invention are provided by the subject matter of the following clauses:

An engine control system for an aircraft comprising: an ECU, wherein the ECU is configured to implement: a production support equipment module, wherein the production support equipment module enables restricted data monitoring of the engine control system; and a selectively removable test support equipment module, wherein the test support equipment module enables a comprehensive interface with the engine control system when installed with the ECU.

The engine control system of any preceding clause, wherein the restricted data monitoring functionality of the production support equipment module enables at least one of: sending a continuous data stream to an aircraft bus from one or more addresses of a memory module or querying an installed software version.

The engine control system of any preceding clause, wherein the comprehensive interface functionality of the test support equipment module enables at least one of: sending a continuous data stream from one or more addresses of the memory module to a test equipment device communicatively coupled to the ECU, modifying a list of addresses stored in memory, making adjustments to the engine control system, reading data from addresses in memory, writing data to addresses in memory, or injecting parameter data into the ECU.

The engine control system of any preceding clause, wherein injecting parameter data into the ECU includes configuring a sensor value for a sensor communicatively coupled to the ECU thereby enabling a simulation of the engine control system.

The engine control system of any preceding clause, wherein the test support equipment module is installed in the engine control system when the aircraft is under development, in production, or undergoing maintenance; and the test support equipment module is uninstalled from the engine control system when the aircraft is not under development, in production, or undergoing maintenance.

The engine control system of any preceding clause, wherein the production support equipment module and the test support equipment module are defined by software modules installed directly in a non-transitory computer readable memory module of the ECU.

The engine control system of any preceding clause, wherein: the production support equipment module is defined by a software module installed directly in a non-transitory computer readable memory module of the ECU; and the test support equipment module is defined by a second software module installed in a line replaceable unit, the line replaceable unit is configured to be selectively interfaced with the engine control system.

The engine control system of any preceding clause, wherein the engine control system is a full authority digital engine control (FADEC) system.

A system comprising: an engine control system comprising: an ECU, wherein the ECU is configured to implement: a production support equipment module, wherein the production support equipment module enables restricted data monitoring of the engine control system; and a selectively removable test support equipment module, wherein the test support equipment module enables a comprehensive interface with the engine control system when installed with the ECU.

The system of any preceding clause, wherein the restricted data monitoring functionality of the production support equipment module enables at least one of: sending a continuous data stream to an aircraft bus from one or more addresses of a memory module or querying an installed software version.

The system of any preceding clause, wherein the comprehensive interface functionality of the test support equipment module enables at least one of: sending a continuous data stream from one or more addresses of the memory module to a test equipment device communicatively coupled to the ECU, modifying a list of addresses stored in memory, making adjustments to the engine control system, reading data from addresses in memory, writing data to addresses in memory, or injecting parameter data into the ECU.

The system of any preceding clause, wherein injecting parameter data into the ECU includes configuring a sensor value for a sensor communicatively coupled to the ECU thereby enabling a simulation of the engine control system.

The system of any preceding clause, wherein the test support equipment module is installed in the engine control system when the aircraft is under development, in production, or undergoing maintenance; and the test support equipment module is uninstalled from the engine control system when the aircraft is not under development, in production, or undergoing maintenance.

The system of any preceding clause, wherein the production support equipment module and the test support equipment module are defined by software modules installed directly in a non-transitory computer readable memory module of the ECU.

The system of any preceding clause, wherein: the production support equipment module is defined by a software module installed directly in a non-transitory computer readable memory module of the ECU; and the test support equipment module is defined by a second software module installed in a line replaceable unit, the line replaceable unit is configured to be selectively interfaced with the engine control system.

The system of any preceding clause, wherein the engine control system is a full authority digital engine control (FADEC) system.

A method of providing an engine control system, the method comprising: providing an ECU; installing a production support equipment module, wherein the production support equipment module enables restricted data monitoring of the engine control system; installing a test support equipment module, wherein the test support equipment module enables a comprehensive interface with the engine control system when installed with the ECU; performing one or more operations with the test support equipment module; and uninstalling the test support equipment module when the test support equipment module is no longer needed for developing, testing, or configuring the engine control system.

The method of any preceding clause, wherein the restricted data monitoring functionality of the production support equipment module enables at least one of: sending a continuous data stream to an aircraft bus from one or more addresses of a memory module or querying an installed software version.

The method of any preceding clause, wherein the comprehensive interface functionality of the test support equipment module enables at least one of: sending a continuous data stream from one or more addresses of the memory module to a test equipment device communicatively coupled to the ECU, modifying a list of addresses stored in memory, making adjustments to the engine control system, reading data from addresses in memory, writing data to addresses in memory, or injecting parameter data into the ECU.

The method of any preceding clause, wherein the engine control system is a full authority digital engine control (FADEC) system.

What is claimed is:

1. An engine control system for an aircraft comprising:
an electronic control unit (ECU) comprising a processor and a non-transitory computer readable memory, wherein the processor is configured to:
in response to at least one of an installation of a production support equipment module in the non-transitory computer readable memory of the ECU and disconnection of a hardware device implementing a test support equipment module from the ECU, enable, through the production support equipment module, restricted data monitoring of the engine control system, wherein restricted data monitoring comprises sending a continuous data stream to an aircraft bus from a list of addresses of the non-transitory computer readable memory and querying of an installed software version, and uninstall the test support equipment module when installed in the non-transitory computer readable memory of the ECU; and in response to an installation of the test support equipment module with the ECU, enable, through the test support equipment module, comprehensive data monitoring and an interface with the engine control system, and uninstall the production support equipment module from the ECU.

2. The engine control system of claim 1, wherein the comprehensive data monitoring and the interface enables at least one of:

sending a continuous data stream from one or more addresses of the non-transitory computer readable memory to a test equipment device communicatively coupled to the ECU, modifying the list of addresses stored in the non-transitory computer readable memory, making adjustments to the engine control system, reading data from addresses in the non-transitory computer readable memory, writing data to addresses in the non-transitory computer readable memory, or injecting parameter data into the ECU.

3. The engine control system of claim 2, wherein injecting parameter data into the ECU includes configuring a sensor value for a sensor communicatively coupled to the ECU thereby enabling a simulation of the engine control system.

4. The engine control system of claim 1, wherein the test support equipment module is installed in the engine control system when the aircraft is under development, in production, or undergoing maintenance; and the test support equipment module is uninstalled from the engine control system when the aircraft is not under development, in production, or undergoing maintenance.

5. The engine control system of claim 1, wherein the production support equipment module and the test support equipment module are defined by software modules installed directly in the non-transitory computer readable memory module of the ECU.

6. The engine control system of claim 1, wherein:

the test support equipment module is defined by a second software module installed in a line replaceable unit, the line replaceable unit is configured to be selectively interfaced with the engine control system.

7. The engine control system of claim 1, wherein the engine control system is a full authority digital engine control (FADEC) system.

8. A system comprising:

an engine control system of an aircraft comprising:

an electronic control unit (ECU), wherein the ECU is configured to:

in response to at least one of an installation of a production support equipment module in a non-transitory computer readable memory of the ECU and disconnection of a hardware device implementing a test support equipment module from the ECU, enable, through the production support equipment module, restricted data monitoring of the engine control system, wherein restricted data monitoring comprises sending a continuous data stream to an aircraft bus from a list of addresses of the non-transitory computer readable memory and querying of an installed software version, and uninstall the test support equipment module when installed in the non-transitory computer readable memory of the ECU; and in response to an installation of the test support equipment module with the ECU, enable, through a selectively removable test support equipment module, comprehensive data monitoring and an interface with the engine control system, and uninstall the production support equipment module from the ECU.

9. The system of claim 8, wherein the comprehensive data monitoring and the interface enables at least one of:

sending a continuous data stream from one or more addresses of the non-transitory computer readable memory to a test equipment device communicatively coupled to the ECU, modifying the list of addresses stored in the non-transitory computer readable memory, making adjustments to the engine control system, reading data from addresses in the non-transitory computer readable memory, writing data to addresses in the non-transitory computer readable memory, or injecting parameter data into the ECU.

10. The system of claim 9, wherein injecting parameter data into the ECU includes configuring a sensor value for a sensor communicatively coupled to the ECU thereby enabling a simulation of the engine control system.

11. The system of claim 8, wherein the test support equipment module is installed in the engine control system when the aircraft is under development, in production, or undergoing maintenance; and the test support equipment module is uninstalled from the engine control system when the aircraft is not under development, in production, or undergoing maintenance.

12. The system of claim 8, wherein the production support equipment module and the test support equipment module are defined by software modules installed directly in the non-transitory computer readable memory of the ECU.

13. The system of claim 8, wherein:

the test support equipment module is defined by a second software module installed in a line replaceable unit, the line replaceable unit is configured to be selectively interfaced with the engine control system.

14. The system of claim 8, wherein the engine control system is a full authority digital engine control (FADEC) system.

15. A method of providing an engine control system, the method comprising:

providing an electronic control unit (ECU) comprising a processor and a non-transitory computer readable memory;

installing a production support equipment module in the non-transitory computer readable memory of the ECU, thereby causing the ECU to enable restricted data monitoring of the engine control system, the restricted data monitoring comprises sending a continuous data stream to an aircraft bus from a list of addresses of the non-transitory computer readable memory and querying of an installed software version;

in response to installation of the production support equipment module, uninstall a test support equipment module when installed with the ECU;

installing the test support equipment module, thereby causing the ECU to enable comprehensive data monitoring and an interface with the engine control system;

in response to installing the test support equipment module with the ECU, uninstall the production support equipment module from the ECU;

performing one or more operations with the test support equipment module;

uninstalling the test support equipment module from the ECU when the test support equipment module is no longer needed for developing, testing, or configuring the engine control system; and in response to uninstallation of the test support equipment module from the ECU, installing or reinstalling the production support equipment module in the non-transitory computer readable memory of the ECU.

16. The method of claim 15, wherein the comprehensive data monitoring and the interface enables at least one of:
   sending a continuous data stream from one or more addresses of the non-transitory computer readable memory to a test equipment device communicatively coupled to the ECU,
   modifying the list of addresses stored in the non-transitory computer readable memory,
   making adjustments to the engine control system,
   reading data from addresses in the non-transitory computer readable memory,
   writing data to addresses in the non-transitory computer readable memory, or
   injecting parameter data into the ECU.

17. The method of claim 15, wherein the engine control system is a full authority digital engine control (FADEC) system.

* * * * *